(12) United States Patent
Menkes (10) Patent No.: US 11,766,605 B2
(45) Date of Patent: Sep. 26, 2023

(54) APPARATUS AND METHOD FOR FACILITATING FINE MOTOR SKILL IMPROVEMENT

(71) Applicant: Shoshana Menkes, Jerusalem (IL)

(72) Inventor: Shoshana Menkes, Jerusalem (IL)

(*) Notice: Subject to any disclaimer, the term of this patent is extended or adjusted under 35 U.S.C. 154(b) by 610 days.

(21) Appl. No.: 16/820,926

(22) Filed: Mar. 17, 2020

(65) Prior Publication Data
US 2020/0215424 A1 Jul. 9, 2020

Related U.S. Application Data

(63) Continuation-in-part of application No. PCT/IL2018/051054, filed on Sep. 17, 2018.

(30) Foreign Application Priority Data

Sep. 18, 2017 (IL) .......................................... 254635

(51) Int. Cl.
*A63F 9/00* (2006.01)
*G09B 19/00* (2006.01)

(52) U.S. Cl.
CPC .......... *A63F 9/0001* (2013.01); *G09B 19/003* (2013.01); *A63F 2250/604* (2013.01)

(58) Field of Classification Search
CPC ................ A63F 9/0001; A63F 2250/604; G09B 19/003
See application file for complete search history.

(56) References Cited

U.S. PATENT DOCUMENTS 1,648,199 A * 11/1927 Sargent .................. A63H 33/04
446/101
2,712,444 A * 7/1955 Reed ..................... A63F 9/0876
273/447

(Continued)

FOREIGN PATENT DOCUMENTS

KR 20100064355 A 6/2010

OTHER PUBLICATIONS

International Search Report for application No. PCT/IL2018/051054 dated Jan. 7, 2019.

(Continued)

*Primary Examiner* — Xuan M Thai
*Assistant Examiner* — Sadaruz Zaman
(74) *Attorney, Agent, or Firm* — MOSER TABOADA (57) ABSTRACT

In a system having multiple coupling elements configured for single-handed coupling and single-handed de-coupling, each coupling element includes a body portion defining an opening and having a base configured to be free-standing. The body portion has an outer limb defining a hook member and at least one slot formed therein, the respective slot of a second initially free-standing coupling element being accessible to the respective hook member of a first suspended coupling element or vice versa. The coupling elements being configured so that mutual points of contact between the first and second coupling elements are maintained during both lifting and lowering the second coupling element thereby facilitating a one-handed intercoupling or decoupling operation with respect to a free standing coupling element disposed upright on a horizontal support surface.

21 Claims, 10 Drawing Sheets

(56) References Cited

U.S. PATENT DOCUMENTS

| | | | | |
|---|---|---|---|---|
| 3,414,265 | A * | 12/1968 | Marks | A63H 33/00 273/447 |
| 3,807,731 | A * | 4/1974 | Lemelson | A63F 9/305 273/447 |
| 4,591,152 | A | 5/1986 | Ellwein | |
| 5,720,617 | A * | 2/1998 | Var | A63F 11/0002 446/491 |
| 6,083,077 | A * | 7/2000 | McGinn | A63H 3/16 446/101 |
| 6,352,262 | B1 * | 3/2002 | Looney | A63F 3/00697 273/288 |
| 7,178,805 | B2 * | 2/2007 | Herbolich, Jr. | A63F 9/26 273/449 |
| D544,551 | S * | 6/2007 | Morimura | D21/504 |
| D585,067 | S * | 1/2009 | Puglisi | D14/434 |
| D605,236 | S * | 12/2009 | Sinisi | D21/502 |
| 7,641,052 | B2 * | 1/2010 | Calendrille, Jr. | B65D 5/4204 206/779 |
| 7,874,560 | B1 * | 1/2011 | Dean | A63F 9/26 273/450 |
| 8,109,518 | B2 * | 2/2012 | Blagg | A63F 9/0243 473/514 |
| D768,952 | S * | 10/2016 | Reichelt | D1/127 |
| D785,900 | S * | 5/2017 | Reichelt | D1/127 |
| D870,216 | S * | 12/2019 | Matei | D21/621 |
| 10,500,478 | B2 * | 12/2019 | Kurita | A63F 9/28 |
| D884,307 | S * | 5/2020 | Reichelt | D1/127 |
| D885,491 | S * | 5/2020 | Herbolich, Jr. | D21/399 |
| D900,426 | S * | 11/2020 | Reichelt | D1/127 |
| D982,106 | S * | 3/2023 | Park | D21/621 |
| 2003/0190855 | A1 * | 10/2003 | Teel | A63H 33/06 446/101 |
| 2010/0080873 | A1 * | 4/2010 | Reichelt | A23G 3/50 426/104 |
| 2020/0215424 | A1 * | 7/2020 | Menkes | A63H 33/00 |

OTHER PUBLICATIONS

International Preliminary Report for application No. PCT/IL2018/051054 dated Dec. 15, 2019.

Extended European Search Report for 18855672.4 dated Jul. 28, 2021.

\* cited by examiner

APPARATUS AND METHOD FOR FACILITATING FINE MOTOR SKILL IMPROVEMENT

CROSS-REFERENCE TO RELATED APPLICATIONS

This application is a continuation-in-part of PCT/IL2018/051054, filed Sep. 17, 2018 and which claims the benefit of and priority to IL Patent Application 254635 filed Sep. 18, 2017, the entire contents of each of these applications is herein incorporated by reference.

FIELD OF THE INVENTION

The present invention relates to the field of fine motor skill development. More particularly, the invention relates to a system and method for facilitating fine motor skill improvement and rehabilitation, for use by example by persons with impaired fine motor skills.

BACKGROUND OF THE INVENTION

Many persons with impaired fine motor skills, resulting from various impairments such as a stroke, an operation, and cerebral palsy, have weakness in their wrists and hands and have difficulty in managing many essential activities of daily living, for example putting on a shirt. Occupational therapists assist those with impaired fine motor skills to undergo specific therapeutic activities; however, these activities generally involve using both hands at the same time.

U.S. Pat. No. 3,414,265 discloses interconnectable toy elements each including a body portion, from which extend first and second arms or hooks which are oppositely disposed and are selectively interconnectable with similar devices to form chain.

U.S. Pat. No. 4,591,152 discloses a toy or game having a plurality of rod-like elements which are linked up serially end-to-end to form a chain. A user holds one element in his or her hand and uses the one element to link up with a second element. The process is repeated from element to element until the supply of elements is depleted or until the chain is broken. The elements each have a ring at one end and a cranked portion at the other end. The cranked portion fits through the ring of an adjacent element in the chain to form an over-and-under connection between the elements.

U.S. Pat. No. 2,712,444 discloses a game comprising wire elements configured for joining together and taking apart.

None of the three above-referenced publications describes a play-piece that is free-standing such that a user is able to construct a chain of interconnected play pieces, all of which are initially free-standing on a support surface and then to separate them by recursively disposing the lowest element on a support surface and disconnecting the remaining chain comprising all the upper elements and repeating until all elements are replaced back on the support surface.

KR20100064355 discloses a ring joint toy having a pair of circular rings which are cut at a slant to form a diagonal slot, which allows two such rings to be coupled but impedes their subsequent separation. The elements may be free-standing, allowing multiple elements to be lifted from a support surface and joined end-to-end. However, once done, the resulting chain in KR20100064355 cannot be separated one-handedly.

U.S. Pat. No. 3,807,731 discloses a hooking game and toy in the shape of a mock toy fish configured to permit it to be hooked in a plurality of manners either by means of a hook suspended on a line or by means of a second toy fish of similar configuration. The fish have a broad base allowing them to be free-standing on a support surface and which may, optionally, be curved thus allowing the fish to rock back and forth. Multiple toy fishes can be lifted from a support surface and joined end-to-end by coupling the respective tail fin of each upper fish to a loop formed in the jaw of the immediately lower fish. It appears also possible to de-couple the chain thus formed by depositing each fish successively back on to the support surface, but this is actually a fairly trivial task because the base of each fish is broad and the center-of-gravity is low so that there is no tendency for the fish to topple over on to its side during either coupling or de-coupling.

Other objects and advantages of the invention will become apparent as the description proceeds.

SUMMARY OF THE INVENTION

It is an object of the present invention to provide a system and method for facilitating fine motor skill improvement and rehabilitation by encouraging use of only one hand during challenging activities.

A coupling element for facilitating fine motor skill improvement, comprises an upper body portion through which a raising force is transmittable; a lower body portion by which another coupling element is able to be suspended therefrom and which is configured with a base to assist the coupling element to be maintained in an upright position when the base is in contact with a horizontal underlying surface; and an opening delimited by at least a region of said upper body portion or lower body portion and into which a body portion of said another coupling element comprising said upper body portion, lower body portion, and opening is introducible, wherein said coupling element is rotationally balanced with respect to a corresponding substantially vertically oriented center line to ensure that the base, when said coupling element is suspended, will be assured of being at a bottom of said suspended coupling element even it was initially at an acute angle with respect to the underlying surface, due to a subsequent rotation of said suspended coupling element about its center of mass, to facilitate a one-handed intercoupling or decoupling operation with respect to said another coupling element.

In one aspect, the coupling element comprises a peripheral body that includes the upper body portion and lower body portion, for example wherein the lower body portion continuously extends from the upper body portion, and that delimits a central opening inwardly from said body into which the body portion of the another coupling element is introducible.

As referred to herein, an "upright position", such as a freestanding position, is a position at which the peripheral body is substantially vertically oriented.

In one aspect, the coupling element is configured with a slot formed at a specific peripheral length of the body, the body portion of the another coupling element being introducible through said slot to the central opening so as to encircle the peripheral body and to be loosely intercoupled with the coupling element in such a way that the coupling element and the another coupling element are irremovable from each other without removing the body portion of the another coupling element through said slot. The peripheral length of the slot is preferably greater than a thickness of the introducible body portion of another coupling element.

In one aspect, the lower body portion is curved and the base is truncated at a bottom portion thereof to define a bottom planar surface which is contactable with the underlying surface.

In one aspect, a body portion at an opposite of the body portion with respect to the center line as the body portion that includes the slot is formed with one or more apertures to achieve rotational balance of the coupling element.

A chain comprising a plurality of serially intercoupled coupling elements is arranged such that a first of said coupling elements is intercoupled with a second coupling element located immediately thereabove.

Although the invention envisages coupling elements of different geometries, a particular challenge arises when the coupling elements have generally rectangular or square openings as will explained in greater detail below with reference to FIG. 11.

A method for facilitating fine motor skill improvement using only one hand comprises the steps of providing a plurality of upright coupling elements, wherein each of said coupling elements comprises an upper body portion, a lower body portion, and an opening delimited by at least a region of said upper body portion or lower body portion; raising a first of said plurality of coupling elements; inserting a body portion of said first element through the opening of a second of said plurality of coupling elements until the body portion of said first element engages and is intercoupled with the upper body portion of said second element; applying an upward force to the upper body portion of said first element to raise said second element; applying a lateral force to the upper body portion of said first element so that said applied lateral force is transmitted to a body portion of said raised second element; and in response to said applied lateral force, selectively introducing the body portion of said second element through the opening of a third of said plurality of coupling elements until the body portion of said second element engages and is intercoupled with the upper body portion of said third element.

In one aspect, the method further comprises the steps of providing a reactive force to the third element, and applying a lateral force to the first and second elements until the second element is removed from the opening of the third element together with the first element which is intercoupled with the second element.

DETAILED DESCRIPTION OF THE INVENTION

Subjects using a kit comprising a plurality of substantially vertically oriented coupling elements are able to serially couple the elements one to another with only one hand and to thereby improve their fine motor skills. The fine motor skills are able to be further improved by use of a slightly or significantly differently configured coupling element that causes the difficulty level in coupling two elements together to be increased.

All of coupling elements are configured with an upper body portion and with a lower body portion, for engagement with another coupling element by a loosely coupled arrangement. The upper body portion is used for raising the given coupling element by another coupling element in coupling relation therewith and positioned thereabove. The lower body portion is used for allowing another coupling element loosely coupled with the given coupling element to be suspended therefrom. The coupling elements are preferably made of a lightweight plastic or elastomeric material, although a metallic material such as aluminum is also in the scope of the invention. The two or more intercoupled coupling elements may be identical, or may be differently configured.

Figure 1:
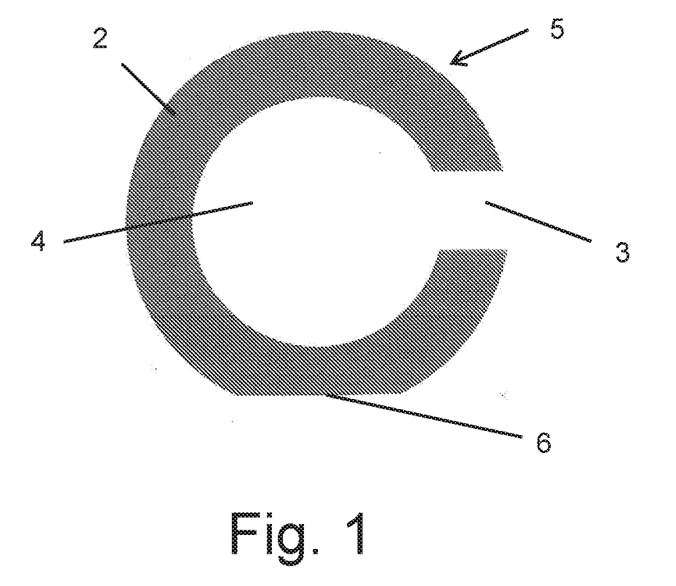
FIGS. 1-7 are a front view of seven different embodiments, respectively, of a coupling element.
Figure 8:
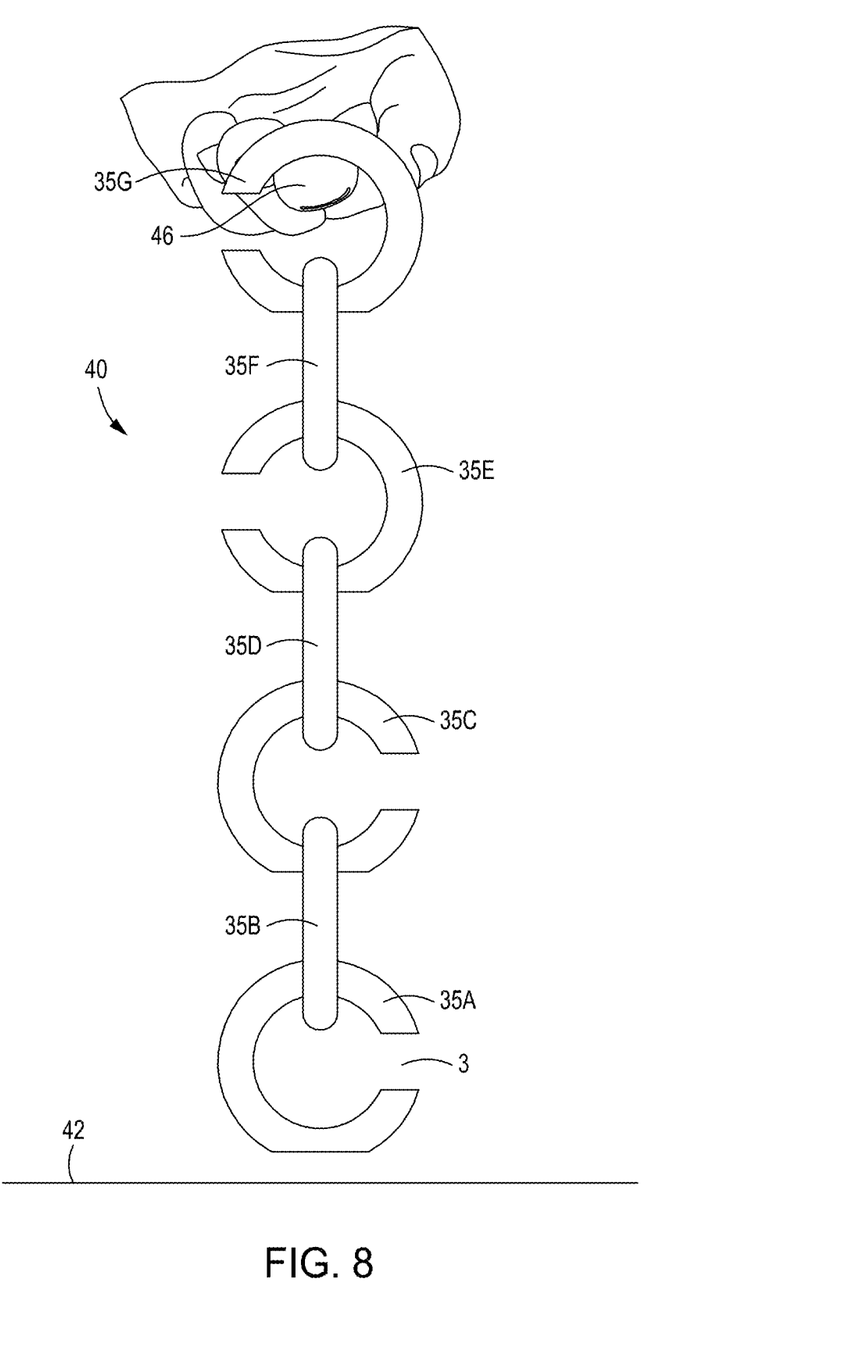
FIG. 8 is a front view of a chain of a plurality of intercoupled coupling elements of FIG. 6.

FIG. 1 illustrates a coupling element 5 according to one embodiment. Coupling element 5 has a C-shaped body 2 of uniform thickness, or alternatively of varied thickness, which is configured with a circular periphery to define a central opening 4 positioned radially inwardly from peripheral body 2 and with a slot 3 formed at one circumferential length of body 2, at an intermediate side portion of the peripheral body. The circumferential, or peripheral, length of slot 3 is greater than the thickness of peripheral body 2 to allow a portion of the body of a second coupling element to be inserted through the slot. Slot 3 may be defined by two peripherally separated straight or curved surfaces formed in body 2. Furthermore, as best shown in FIG. 8 the coupling element is dimensioned so that while on the one hand it is free-standing, on the other hand it is easily toppled. As a result, infelicitous coupling of two elements whereby the lower element is not cleanly inserted into the slot of a free-standing coupling element is apt to impart sufficient force to the free-standing element to topple. Once this happens, the slot will then lie flat on the support surface and no longer be accessible thus preventing it from being added to the chain.

It is well understood that an object will remain upright or will return to an upright position after being tilted provided that its center of gravity remains contained within the boundary of its base. Conversely, it will topple or fall over when it is tilted to such an extent that its center of gravity is no longer contained within the boundary of its base. Typical dimensions of the coupling elements are width equal to 4.5 mm and height equal to 34 mm. When free-standing, the center of gravity lies within the base and intersects the base mid-way across the base. The slot is half-way up the element i.e. at an approximate height of 17 mm. An upper element is coupled to a free-standing lower element by inserting the shank of the upper element through the opening of the lower element. This will be on the threshold of toppling over when the coupling element rotates through an angle $\theta$ where the center of gravity lies on a line that intersects an edge of the base, i.e. where the center of gravity is collinear with the diagonal through a cross-section of the coupling element that lies on the support surface.

It can easily be shown that the angle $\theta$ is equal to $\tan^{-1}(4.5/34)=7.5°$. The lateral displacement applied mid-way (i.e. at the location of the opening) to cause this rotation is given by $17 \cdot \sin(\theta)=2.23$ mm. Thus if the coupling element is displaced laterally by more than approximately 2.2 mm it will in fact fall over altogether. Obviously, the larger the height of the coupling element relative to the width of its base, the more likely it is to topple over and therefore the dimensions of the coupling elements may be selected according to the degree of challenge to which a user is subjected.

Use of such a system commences by depositing a set of multiple like coupling elements upright on a support surface, such as a table. A second coupling element is positioned at an angle with respect to body 2 of the first coupling element, such as when the first and second coupling elements are vertically oriented and are substantially mutually perpendicular to each other, a lower portion of the body of the second coupling element is inserted through slot 3 towards central opening 4. After the lower body portion of the second coupling element is introduced into central opening 4, it encircles the peripheral body of the first coupling element, so that the first and second coupling elements will be loosely coupled together in such a way that they are irremovable from each other without removing the second coupling element from the slot of the first coupling element. When the first and second coupling elements are loosely coupled together, respective body portions of each of the first and second coupling elements are in contact with each other, yet are each able to move. As the slot of the second coupling element is also located at a side portion of its peripheral body, a third coupling element may be coupled to the second coupling element in a similar fashion.

A one-handed coupling operation may be made possible when the first coupling element 5 is freestanding or otherwise in an upright position, and both slot 3 and central opening 4 are vertically spaced from an underlying surface, to allow displacement of the second coupling element without interfering with the underlying surface. Although peripheral body 2 is circular, it is able to be freestanding on top of the underlying surface by being truncated at a bottom portion thereof to define a bottom planar surface 6. The thickness of peripheral body 2 is sufficiently great to allow first coupling element 5 to be stably freestanding without wobbling while planar surface 6 contacts the underlying surface.

Figure 2:
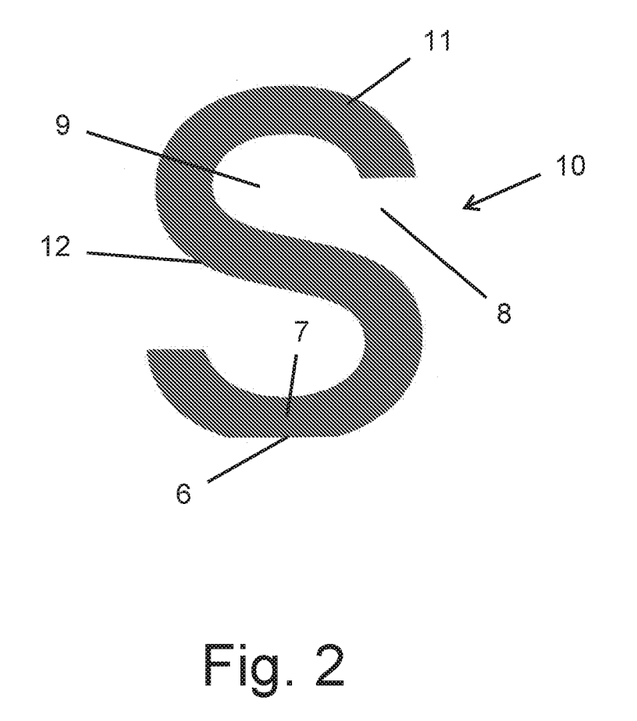

An S-shaped coupling element 10 is illustrated in FIG. 2. A lower portion 7 of the S-shaped body, which may be truncated with planar surface 6, is insertable through the slot 8 of another similarly shaped coupling element, so that the two coupling elements will be loosely coupled together. Slot 8 is defined by the interspace between the terminal end of upper portion 11 of the S-shaped body and an intermediate portion 12. Lower portion 7 is displaced towards opening 9 of the other coupling element, which is located between upper portion 11 and intermediate portion 12, after being inserted through slot 8.

Figure 3:
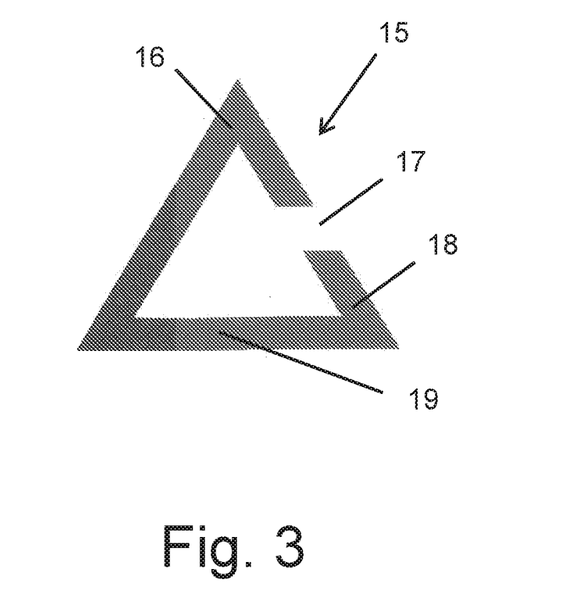

A triangular coupling element 15 is illustrated in FIG. 3. The body of coupling element 15 preferably defines an equilateral triangle, although other triangle configurations may also be provided. Slot 17 is formed in one of the sides 18 of the body. Body portion 16 in the vicinity of the upper apex constitutes at least a part of the upper body portion. Base 19 constitutes the lower body portion and also the bottom planar surface that allows coupling element 15 to be freestanding.

Figure 4:
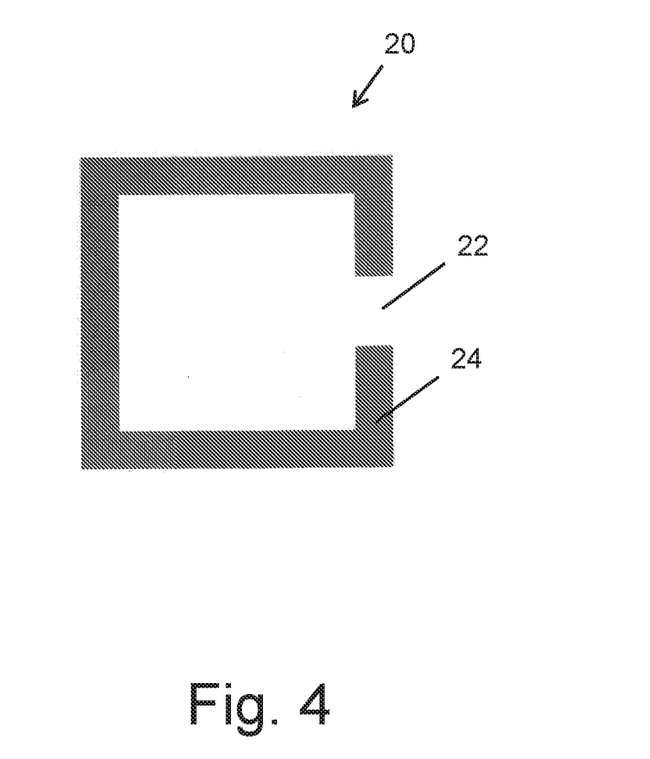

A square coupling element 20 is illustrated in FIG. 4. Slot 22 is formed in one of the sides 24 of the body.

Figure 5:
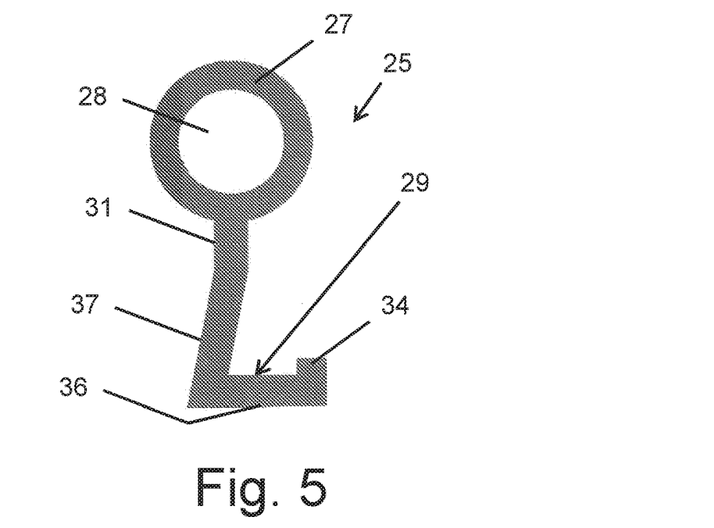

FIG. 5 illustrates coupling element 25, which is configured with a closed and circular upper body portion 27 which encircles interior 28 and with an L-shaped lower body portion 29. A short linear spacer 31 extends downwardly from the lowermost region of upper body portion 27, and the long leg 37 of lower body portion 29 extends downwardly and obliquely from the bottom of spacer 31. The terminal end 34 of L-shaped lower body portion 29, which slightly protrudes upwardly from base 36 in hook-like fashion and is separated from a substantially vertically oriented long leg 37 by a distance greater than the thickness of upper body portion 27, is adapted to be inserted through the upper body interior 28 of a coupling element positioned therebelow and to engage the face of the upper body portion of the lower coupling element which is distant from long leg 37. Thus the lower coupling element, which may be freestanding above an underlying surface by the planar base 36, is able to be raised by an upper coupling element in coupling relation therewith by virtue of the engagement by the protruding terminal end 34.

In another embodiment, each coupling element is configured to be rotationally balanced despite the presence of a side slot, or any other opening formed in a body portion through which a portion of another coupling element is able to be introduced in order to be intercoupled. The ability of a coupling element to be rotationally balanced advantageously ensures that it will always be oriented in an identical fashion after being loosely coupled with another coupling element. Thus the planar surface will be assured of being at the bottom of a suspended coupling element even though the planar surface was initially at an acute angle with respect to the horizontal underlying surface, for example when being raised or when being loosely coupled with another coupling element, due to the subsequent rotation of the suspended coupling element about its center of mass. Since the planar surface of a suspended coupling element is assured of being substantially horizontal, the suspended coupling element can be easily returned to a freestanding position with relation to the underlying surface and then an upper coupling element can be decoupled from a lower coupling element, even during a one-handed operation. Also, another coupling element can be easily loosely coupled therewith since the slot, or any other suitable opening through which a suitable body portion is introduced in order to be intercoupled, is accessible to the subject performing an intercoupling operation.

Figure 6:
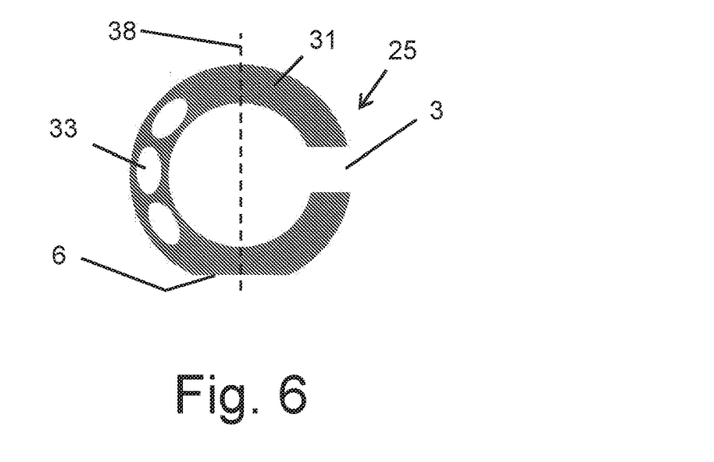

As shown in FIG. 6, the peripheral body 31 of C-shaped coupling element 35, which is configured similarly to coupling element 5 of FIG. 1, is formed with a plurality of apertures 33. Without the formation of apertures 33, coupling element 35 would be rotationally imbalanced with respect to vertical centerline 38, generally passing through the center of mass of coupling element 35 and perpendicular to bottom planar surface 6. Due to the presence of side slot 3, the weight of the body portion of coupling element 35 located at the right side of centerline 38, which includes slot 3, would be less than the body portion located at the left side of centerline 38, and bottom planar surface 6 may remain at an angle with respect to the horizontal underlying surface after being initially oriented at that disposition. With the formation of a plurality of apertures 33, e.g. three apertures, all at the left side of centerline 38, the right side body portion and the left side body portion are afforded substantially the same weight, allowing coupling element 35 to be rotationally balanced. Thus bottom planar surface 6 will return to a substantially horizontal disposition, following rotation of body 31 about its center of mass, if surface 6 were initially positioned at an acute angle with respect to the underlying surface.

Alternatively, the thickness of the left side body portion may be reduced relative to the right side body portion so that the peripheral body will be rotationally balanced.

Figure 7:
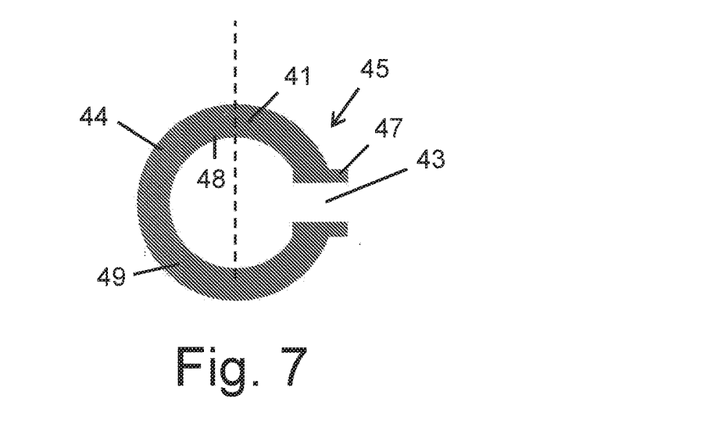

Alternatively, as shown in FIG. 7, coupling element 45 is configured to be rotationally balanced by increasing the weight of the right side body portion 41 that includes side slot 43 relative to left side body portion 44. To increase the weight of the right side body portion 41, two appendages 47 delimiting side slot 43, which may be linearly shaped and mutually parallel, extend from a region near the inner edge 48 of the peripheral body and protrude outwardly from the outer edge 49 of the peripheral body. With the addition of the two appendages 47, the weight of right side body portion 41 is substantially equal to left side body portion 44 despite the presence of side slot 43.

FIG. 8 illustrates a chain 40 of a plurality of intercoupled coupling elements 35A-G arranged such that each coupling element is intercoupled with a coupling element located immediately thereabove. Coupling elements 35A, 35C, 35E and 35G are substantially co-planar, with the slot 3 of coupling elements 35A and 35C facing to the right according to the illustrated orientation and the slot of coupling elements 35E and 35G facing to the left. Coupling elements 35B, 35D, and 35F are likewise substantially co-planar, while being substantially perpendicular to the plane of the coupling elements 35A, 35C, 35E and 35G.

Chain 40 may be formed after all of coupling elements 35A-G are freestanding on top of underlying surface 42. While manipulating the coupling elements with only one hand, a coupling element 35G is held, such as when the index finger 46 is inserted through its central opening and another finger contacts the peripheral body for increased control, the lower body portion of coupling element 35G is inserted through the side slot of the freestanding coupling element 25F into the central opening of the latter, when coupling elements 35F and 35G are substantially vertically oriented with their respective planes substantially perpendicular to each other. Accordingly, when index finger 46 subsequently applies an upward force to coupling element 35G, the lower body portion of coupling element 35G transmits the force to the upper body portion of coupling element 35F, causing the latter to be raised above underlying surface 42. Since coupling element 35F is rotationally balanced, its bottom planar surface will remain in a substantially horizontal disposition even after being raised and being slightly tilted. When coupling elements 35F-G are intercoupled and in a raised position, this procedure is sequentially repeated for coupling elements 35E, 35D, 35C, 35B and 35A.

Figure 9:
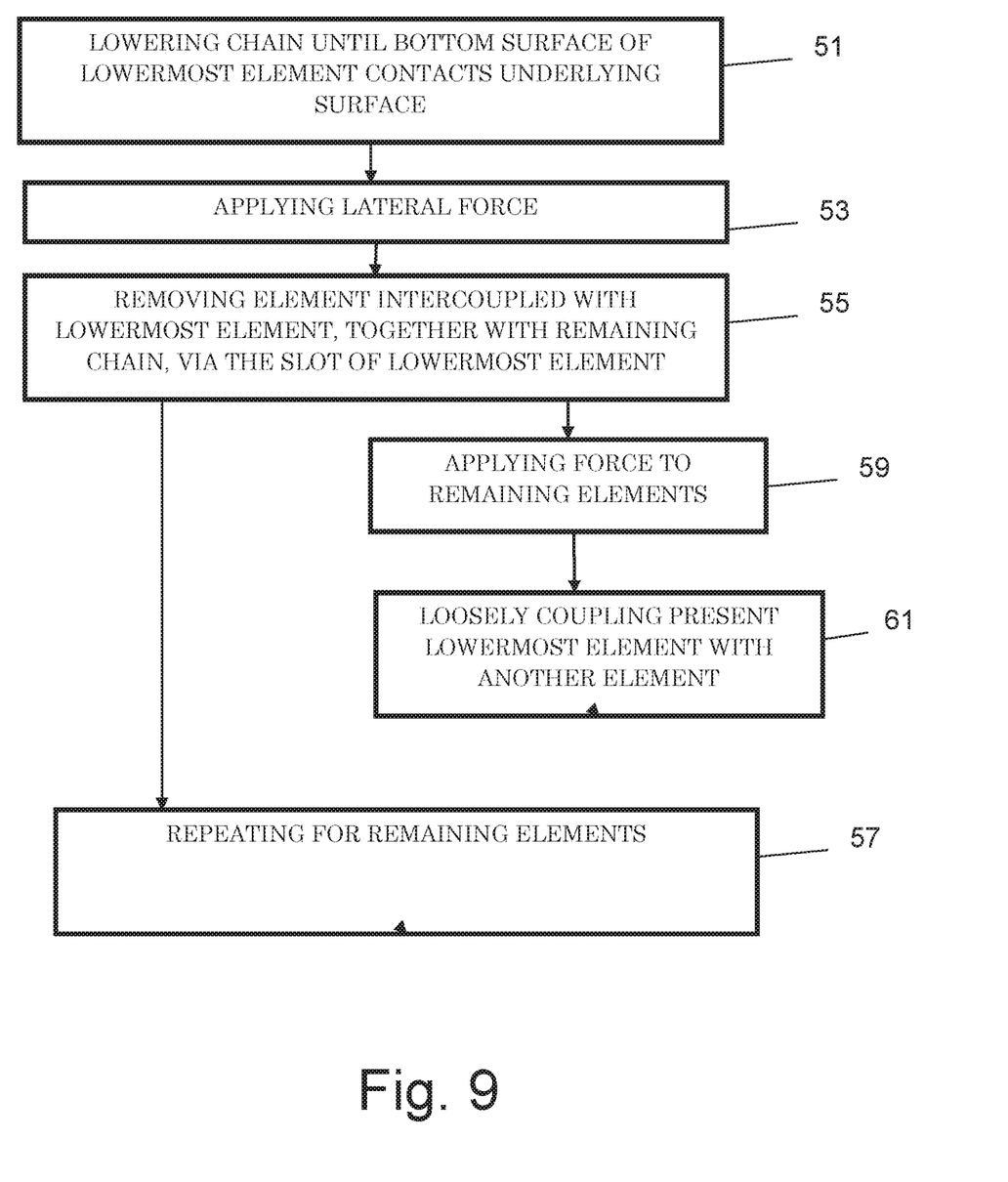
FIG. 9 is a flow chart of a method to decouple a plurality of intercoupled coupling elements.

In order to return all of the intercoupled coupling elements 35A-G to the freestanding position, this procedure is reversed with use of only one hand. That is, as illustrated additionally in FIG. 9, chain 40 is lowered in step 51 by applying a hand initiated force until the bottom planar surface of the lowermost coupling element 35A contacts underlying surface 42. Index finger 46 then selectively applies a lateral force onto uppermost coupling element 35G in step 53, causing the lateral force to be transmitted to the other intercoupled coupling elements so that coupling element 35B intercoupled with lowermost coupling element 35A will be removed in step 55 via slot 3 of coupling element 35A. A chain of coupling elements 35B-G remains. This procedure may be sequentially repeated in step 57 for the remaining intercoupled coupling elements until they are returned to the freestanding position, or, alternatively, an upward force is applied to the remaining intercoupled coupling elements in step 59 so that when an additional selective lateral force is applied, the present lowermost coupling element will become loosely coupled with a desired freestanding coupling element in step 61.

Figure 10:
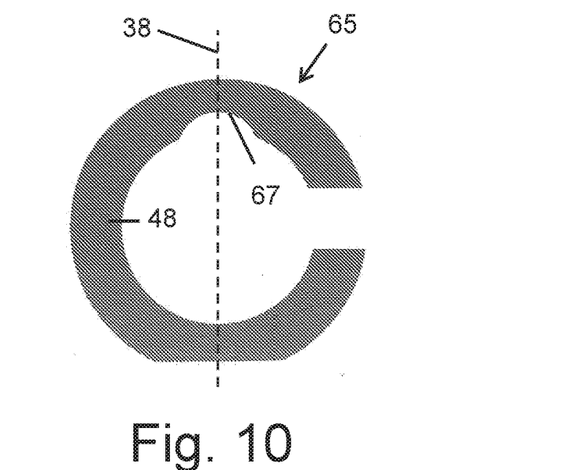
FIGS. 10, 11, 11A-C and 12 are a front view of six different embodiments, respectively, of a coupling element.

FIG. 10 illustrates a C-shaped coupling element 65 which is similar to coupling element 5 of FIG. 1, but formed with a concave seat 67, which is recessed from the inner edge 48 of the upper body portion at centerline 38. Concave seat 67 is used for securely positioning a coupling element which is intercoupled with coupling element 65.

Figure 11:
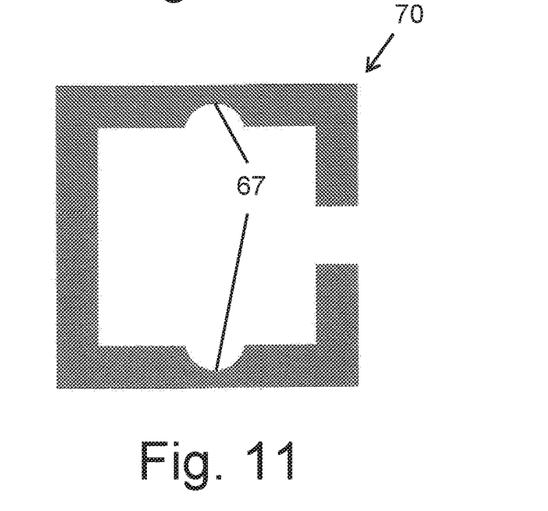
Figure 11A:
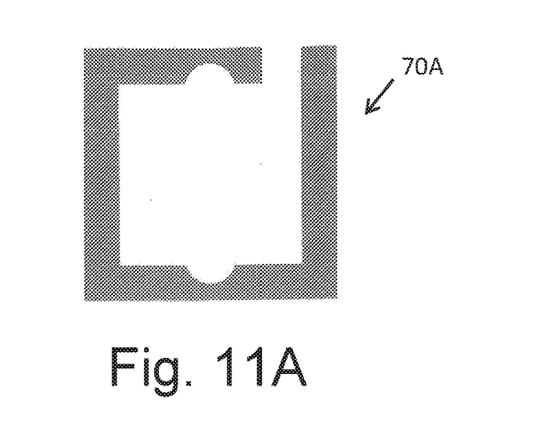
Figure 11B:
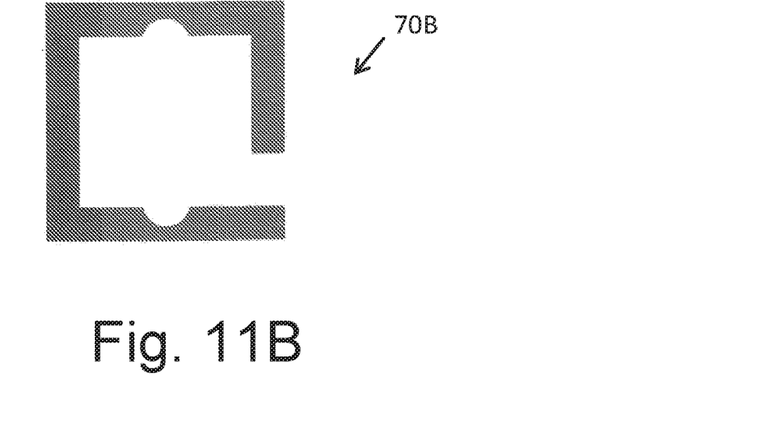
Figure 11C:
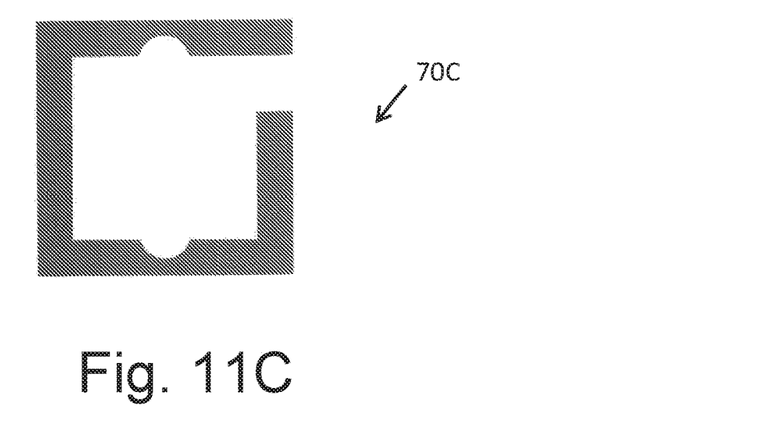
Figure 15:
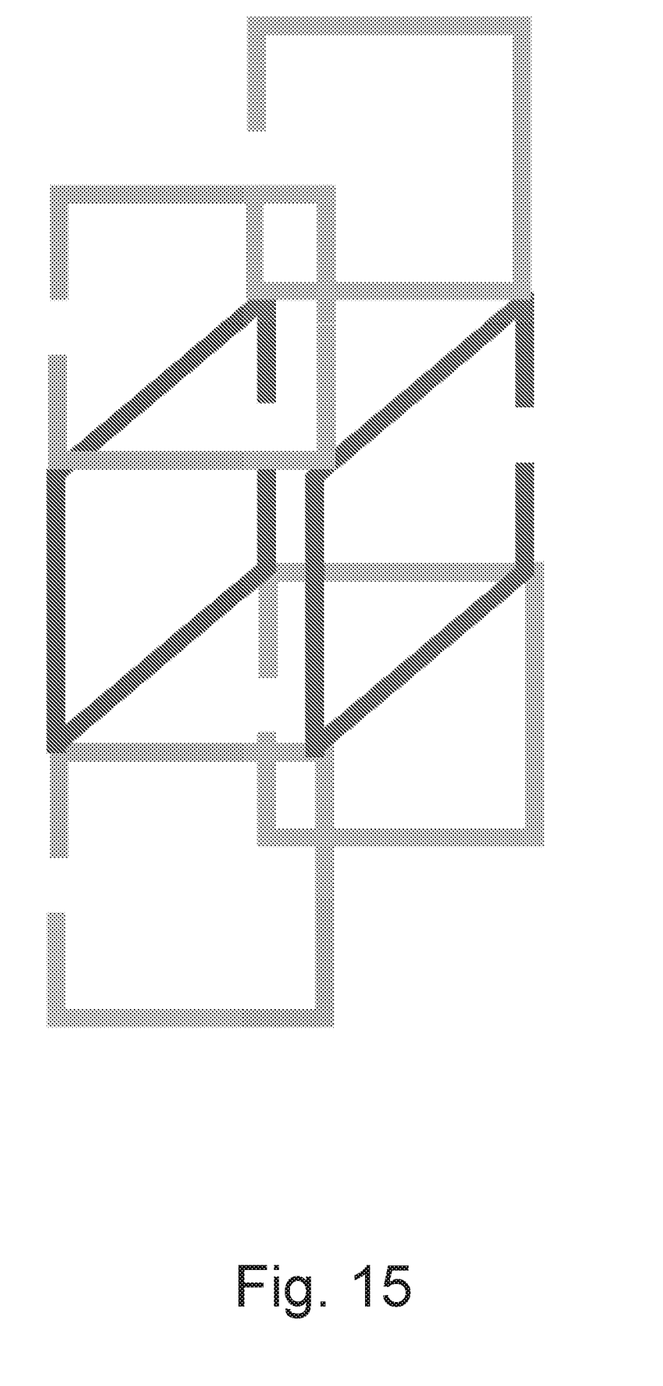
FIG. 15 is a perspective view of a 3-D array of composite arrangements, according to another embodiment.

A square coupling element 70 shown in FIG. 11, which is similar to coupling element 20 of FIG. 4, is configured with two concave seats 67, which are recessed from the inner edge of the upper and lower body portions, respectively, at the centerline between the right and left body portions. FIGS. 11A-C illustrate three square coupling element 70A-C, respectively, which are variations of coupling element 70, but configured with a differently located slot through which another coupling element to be intercoupled is introduced. According to another embodiment, square coupling element 70 shown in FIGS. 11 and 4 may be used to implement a 3-D array of composite arrangements. In this case, two square coupling elements 70 are put on top of each other, so as to obtain an array of standing elements. The standing elements are positioned on top of a surface, where at least a pair of elements are parallel to each other and form a bottom level, and the next level is placed on top of the preceding level, while rotating their orientation, as shown in FIG. 15. In order to facilitate access, the opening of each element is kept on a side limb.

More specifically, the coupling elements in FIG. 15 are square or rectangular in cross-section and have at least one recess for engaging the hook member of a supporting element or for facilitating engagement by the hook member with an initially free-standing coupling element. The structure of FIG. 15 is constructed as follows:

(a) depositing multiple coupling elements in free-standing disposition on a support surface with at least first and second elements parallel to each other to form a support structure wherein adjacent coupling elements in said support structure are spaced apart by a distance that is less than a length of the base of a third coupling element;

(b) single-handedly lifting the third coupling element so that it is suspended by the hand;

(c) placing the third coupling element on top of the support structure for support by adjacent coupling elements thereof, while rotating their orientation to ensure that the slot of each element is retained in a side limb; and (d) repeating (a) to (c) with additional coupling elements.

It should be explained that coupling elements having generally rectangular or square openings pose a more difficult challenge than those having circular openings as described above. The reason for this is that when a C-shaped element is suspended from the lower limb of an immediately adjacent upper element, the suspended element will find its own equilibrium by sliding along its curvature on the supporting limb until it is rotationally balanced. However, a coupling element that is suspended by a straight limb rather than a concave limb will slide uncontrollably and will not be able to find a stable position wherein it hangs symmetrically. Thus, in the case where the opening is of generally square cross-section, the suspended limb of the lower element will slide until the inner top corner of its opening abuts the supporting limb and is thus prevented from further movement.

As a result, a slot formed in the side limb of the lower element will no longer be parallel to the support surface but will be tilted upward or downward, depending on the direction in which the suspended element slides on the lower supporting limb of the upper element. Likewise, a slot formed in the top limb of the lower element will no longer be normal to the support surface. In either case, it becomes very difficult if not impossible to bring the slot of the currently supported lower element into engagement with a horizontal or vertical limb of a free-standing element. It is therefore necessary when using coupling elements of square or rectangular cross-section to ensure that when the free-standing element is suspended, it will nevertheless hang such that its base remains parallel to the support surface, This is achieved by providing a recess in the inner surface of at least the upper limb of each of the elements, so that a free-standing element can be supported by proper alignment of its recess with the lower limb of the supporting element. This offers an additional degree of challenge to those having impaired motor skills.

The challenge posed by the invention may be further extended regardless of specific geometry of the coupling elements by requiring that they be coupled in a specific order and/or deposited on a support surface at predefined locations. For example, the coupling elements according to any of the embodiments may have visual identifications for coupling in a defined order. Upon disassembly, coupling elements are deposited on a mat or other support surface having marked locations where the elements are to be deposited according to their identity. For example, the elements and the locations may be numbered. In an extension of this approach, the coupling elements may be color coded for assembling in a prescribed order and for decoupling and depositing on marked locations of the same color.

Figure 12:
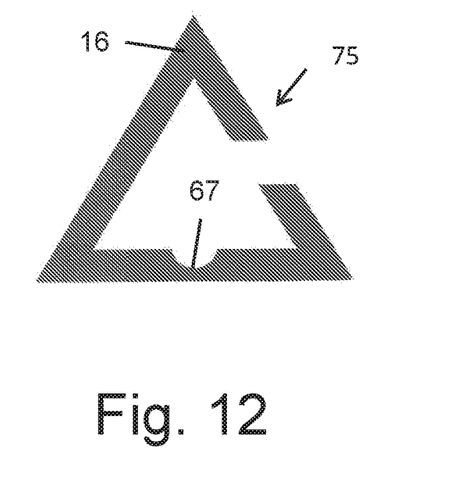

Triangular coupling element 75 shown in FIG. 12, which is similar to coupling element 15 of FIG. 3, is configured with a concave seat 67, which is recessed from the inner edge of the lower body portion, at the centerline between the right and left body portions. Another coupling element may be securely positioned at the inner edge of apex 16 of the upper body portion, and therefore a recessed seat is unnecessary.

It will be appreciated that the seat may be configured in other ways as well, such as by a notched configuration, for example a notch having straight walls.

In all embodiments, the coupling elements are configured so that mutual points of contact between the first and second coupling elements are maintained during both lifting and lowering an initially free-standing coupling element, thereby facilitating a one-handed intercoupling or decoupling operation with respect to the free standing coupling element disposed upright on a horizontal support surface. Where this requirement is not met inherently due to the geometry of the coupling element, at least one recess may be provided for engaging the hook member of a supporting element or for facilitating engagement by the hook member with an initially free-standing coupling element.

Likewise, opposing recesses may be provided in the coupling elements i.e. one in the hook member and the other in the opposite limb or portion that is engaged by the hook of a suspended coupling element. Alternatively, instead of recesses, the same functionality can be realized by a bore and a protrusion or by magnets etc.

Figure 13:
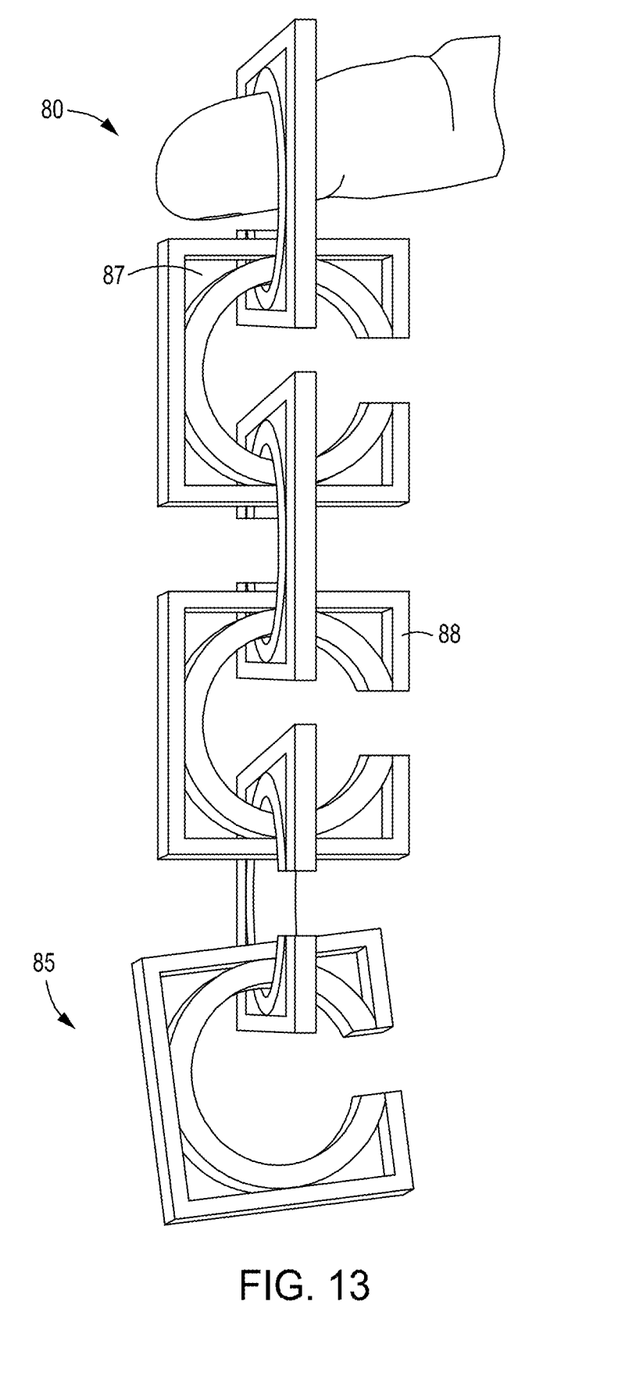
FIG. 13 is a front view of another embodiment of a chain of a plurality of intercoupled coupling elements.

FIG. 13 illustrates a chain 80 formed by a plurality of coupling elements 85. Each coupling element 85 comprises a C-shaped coupling element of FIG. 1 or FIG. 10 which is inscribed within, and integrally formed with, the square-shaped coupling element of FIG. 4. While some regions 87 radially outwardly from the circular periphery of the C-shaped coupling element have an empty space, one region 88 is solid to provide rotational balance by virtue of its increased weight relative to a region 87.

Each coupling element 25 of FIG. 5, when intercoupled in a chain, may be made to be rotationally balanced when the terminal end 34 of each of two adjacent mutually parallel coupling elements is positioned in opposite directions.

Figure 14:
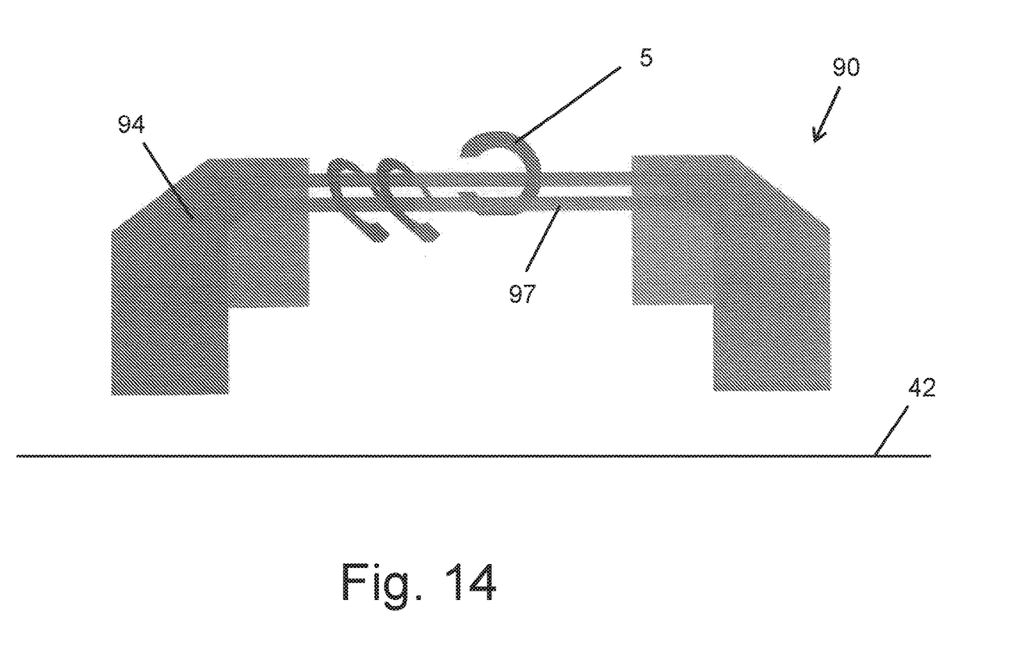
FIG. 14 is a front view of a stand used to hold a plurality of coupling elements in an upright position.

In one embodiment, as shown in FIG. 14, a stand 90 may be used to hold a plurality of coupling elements, e.g. coupling elements 5, in an upright, substantially vertical, position which facilitates the intercoupling with another coupling element, as described hereinabove. In the upright position, the slot of a coupling element may be positioned to the side of the coupling element, or at its bottom.

Stand 90 is configured with two spaced angled elements 94 positioned on top of underlying surface 42, which is generally horizontal, and with two laterally spaced horizontal bars 97 extending between the two angled elements 94. The rounded inner surface of a coupling element 5 is sized so that it will be able to be in engagement with the two bars 97 at the same time, yet there will be a sufficient clearance above the bars 97 and below the body portion of the coupling element to allow another coupling element to be introduced through the clearance and to lift the held coupling element above bars 97. It will be appreciated that any other coupling element described herein may be held by stand 90 in an upright position, in order to be intercoupled by another coupling element.

As may be appreciated by a review of the description hereinabove, the coupling elements are adapted to assist in improving fine motor skills by having to introduce a body portion of a first coupling element through the slot, or any other suitable opening, of a second coupling element so that the two coupling elements will be intercoupled. These motions are often difficult for those suffering from impaired fine motor skills.

In order to further improve fine motor skills, the difficulty level in coupling two elements together may be increased by changing the configuration of a coupling element in one or more of the following ways:

1. Reducing the width of the bottom planar surface of a coupling element, by which it is able to be stably freestanding on top of an underlying surface, to a dimension significantly less than 5 mm, e.g. 4 mm, will cause the freestanding coupling element to wobble to a certain extent and therefore will require the subject to perform the intercoupling operation more adroitly.

2. Reducing the width, or the peripheral length, of a slot, or of any other suitable opening, through which a body portion of another coupling element is introducible so that two coupling element will be intercoupled, to a dimension significantly less than 8 mm, e.g. 6 mm, will require the subject to introduce a body portion of the another coupling element more carefully such as with a firmer grip.

3. Providing a coupling element without a seat adapted to securely position an intercoupled element, or reducing the maximum depth of the seat to a maximum depth less than approximately 2 mm relative to the inner surface of the peripheral body, e.g. 1.5 mm, is more challenging to the subject as the intercoupled element will wobble to a certain extent during an intercoupling or decoupling operation.

4. Providing a coupling element that is rotationally imbalanced will result in the base, or the bottom surface, of a first coupling element that is the lowermost element of a chain not to be parallel with the underlying surface, thus increasing the difficulty in introducing a body portion of a second coupling element through the slot of the first coupling element, which slot is angularly spaced from the underlying surface by an acute angle.

5. Forming the slot adjacent to an upper or lower body portion, as shown in FIGS. 11A-C, rather than in a central body portion.

6. Providing a protrusion extending slightly downwardly from the base that is adapted to be received in a complementary cavity, recess or groove formed in the underlying surface requires the subject to carefully and difficultly direct the protrusion so that the coupling element will be positioned in an upright position.

7. Providing a protrusion extending slightly upwardly from the underlying surface that is adapted to be received in a complementary cavity, recess or groove formed in the base of the coupling element requires the subject to carefully and difficultly direct the coupling element so that it will be positioned in an upright position.

8. Providing a planar base portion of a first coupling element with a cavity, recess or groove that is adapted to receive a planar or non-planar upper body portion of a second coupling element, so that the first and second coupling elements will be positioned in a stacked and abutting relationship. The difficulty level is considerably increased during attempts to form a chain with an additional coupling element, or to remove a coupling element from an existing chain, without disrupting this stacked relationship.

Negation of any of these changes will of course reduce the difficulty level.

While some embodiments of the invention have been described by way of illustration, it will be apparent that the invention can be carried out with many modifications, variations and adaptations, and with the use of numerous equivalents or alternative solutions that are within the scope of persons skilled in the art, without exceeding the scope of the claims.

The invention claimed is:

1. A coupling element configured for single-handed coupling and single-handed de-coupling to another like coupling element to form a chain of multiple coupling elements, each coupling element comprising:
   an upper body portion;
   a lower body portion by which another coupling element is able to be suspended therefrom and having a planar flat bottom surface for maintaining the coupling element in an upright position when the bottom surface is in contact with a horizontal underlying surface;
   an opening delimited by at least a region of said upper body portion or lower body portion and into which a body portion of another coupling element comprising said upper body portion, lower body portion, and opening, is introducible,
   wherein each of said coupling elements is rotationally balanced with respect to a corresponding substantially vertically oriented center line to ensure that the bottom surface, when said coupling element is suspended and lowered, will remain substantially horizontal even if it was initially at an acute angle with respect to the horizontal underlying surface, due to a subsequent rotation of said suspended coupling element about its center of mass, thereby facilitating one-handed intercoupling of a suspended coupling element or a chain of successively suspended coupling elements to another coupling element that is initially disposed upright on said surface and to allow one-handed decoupling of a lowermost coupling element in said chain while maintaining the lowermost coupling element upright on said surface,
   wherein the upper body portion and lower body portion form a peripheral body that defines said opening, and wherein the opening includes a slot into which the peripheral body of another like coupling element is introducible whereby the two coupling elements are loosely intercoupled and are decoupled by lowering the chain of multiple coupling elements so that the lowermost coupling element stands upright on said surface and removing the peripheral body of one coupling element through the slot of the another coupling element.

2. The coupling element according to claim 1, wherein said coupling element is dimensioned to be easily toppled from a free-standing orientation when the coupling element is tilted through an angle of more than 5°.

3. The coupling element according to claim 1, wherein the slot is formed on a first side of the peripheral body and apertures are formed in an opposite side of the peripheral body to compensate for a reduction in mass on the first side caused by the slot.

4. The coupling element according to claim 1, wherein the slot is formed on a side of the peripheral body and the peripheral body on said side is weighted to compensate for a reduction in mass caused by the lot.

5. The coupling element according to claim 1, wherein the peripheral body is C-shaped.

6. The coupling element according to claim 1, wherein the peripheral body is S-shaped.

7. The coupling element according to claim 1, wherein the peripheral body is triangular in shape.

8. The coupling element according to claim 1, wherein the peripheral body is rectangular or square in shape.

9. The coupling element according to claim 1, wherein the peripheral body is key shaped having an elongated upright L-shaped portion supporting a ring on an upper end and defining a leg at its lower end.

10. The coupling element according to claim 1, wherein the bottom surface is less than 5 mm in width and the slot is less than 8 mm in height.

11. The coupling element according to claim 1, wherein the coupling element has a concave seat or recess centrally disposed in an inner edge of the upper body portion for securely positioning an intercoupled.

12. A method for using a plurality of coupling elements according to claim 1 to improve fine motor skills, said method comprising:
   (a) depositing said multiple coupling elements of the in free-standing disposition on a support surface;
   (b) single-handedly lifting a first of said elements so that it is suspended by the hand and with its bottom surface maintained horizontal;
   (c) inserting peripheral body of the first suspended coupling element into the opening of a second free-standing coupling element and lifting the second coupling element off the support surface to form a suspended chain of intercoupled coupling elements, wherein the bottom surface of the lowermost is maintained horizontal; and
   (d) repeating (c) until all the chain is complete and no further coupling elements remain upright on the support surface.

13. The method according to claim 12, further including:
   (e) lowering the chain such that the bottom surface of a lowermost coupling element thereof is maintained horizontal until the lowermost coupling element is deposited in free-standing disposition on the support surface;
   (f) lowering the chain further until the next to lowermost coupling element loses contact with the lowermost coupling element at its point of interconnection;

(g) removing the peripheral body of the next to lowermost coupling element from the opening of the lowermost coupling element; and (h) repeating (e) to (f) until all coupling elements in the chain are again free-standing on the support surface.

14. The method according to claim 13, wherein the coupling elements are coupled and de-coupled without inducing the lowermost free-standing coupling element to fall.

15. The method according to claim 13, wherein the coupling elements are coded for depositing on a mat or other support surface having marked locations that are similarly coded and the method further includes depositing the coupling elements on marked locations of the same code.

16. The method according to claim 15, wherein the coupling elements are color coded for depositing on marked locations of the same color.

17. A method for improving fine motor skills using a plurality of coupling elements according to claim 8, each having a square shaped peripheral body defining an opening and having a slot in a side limb thereof, said method comprising:

(a) depositing said coupling elements in free-standing disposition on a support surface with at least first and second of said coupling elements parallel to each other to form a support structure and with their respective slots on a side limb of the coupling elements, wherein adjacent coupling elements in said support structure are spaced apart by a distance that is less than a length of the bottom surface of a third coupling element of said coupling elements;

(b) single-handedly lifting the third coupling element so that it is suspended by the hand with its bottom surface maintained horizontal and with its slot in a side limb;

(c) placing the third coupling element on top of the support structure for support by adjacent coupling elements thereof; and (d) repeating (a) to (c) with additional coupling elements.

18. The coupling element according to claim 1, wherein the lower body portion continuously extends from the upper body portion.

19. The coupling element according to claim 18, wherein the lower body portion is curved and the bottom surface is truncated at a bottom portion thereof to define the planar flat bottom surface which is contactable with the horizontal underlying surface.

20. The coupling element according to claim 1, wherein a width of the bottom surface of the coupling element is dimensioned to prevent the coupling element from standing upright stably on said surface when coupling or decoupling.

21. The coupling element according to claim 1, wherein the opening and the peripheral body of the coupling elements are dimensioned to increase a difficulty of coupling and decoupling.

* * * * *